(12) United States Patent
Ravikovitch et al.

(10) Patent No.: US 9,168,483 B2
(45) Date of Patent: Oct. 27, 2015

(54) DDR TYPE ZEOLITES WITH STABILIZED ADSORPTION

(71) Applicants: Peter I. Ravikovitch, Princeton, NJ (US); Barbara Carstensen, Annandale, NJ (US); Charanjit S. Paur, South Bound Brook, NJ (US); Ivy D. Johnson, Lawrenceville, NJ (US); Harry W. Deckman, Clinton, NJ (US)

(72) Inventors: Peter I. Ravikovitch, Princeton, NJ (US); Barbara Carstensen, Annandale, NJ (US); Charanjit S. Paur, South Bound Brook, NJ (US); Ivy D. Johnson, Lawrenceville, NJ (US); Harry W. Deckman, Clinton, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 151 days.

(21) Appl. No.: 14/074,918

(22) Filed: Nov. 8, 2013

(65) Prior Publication Data

US 2014/0157986 A1    Jun. 12, 2014

Related U.S. Application Data

(60) Provisional application No. 61/734,010, filed on Dec. 6, 2012, provisional application No. 61/734,007, filed on Dec. 6, 2012, provisional application No. 61/734,012, filed on Dec. 6, 2012.

(51) Int. Cl.
  *B01D 53/04*  (2006.01)
  *B01D 53/047*  (2006.01)
  *B01D 69/14*  (2006.01)
  *B01J 20/30*  (2006.01)
  *C01B 39/48*  (2006.01)
  *B01D 53/02*  (2006.01)
  *C01B 37/02*  (2006.01)

(52) U.S. Cl.
  CPC .............. *B01D 53/04* (2013.01); *B01D 53/02* (2013.01); *B01D 53/047* (2013.01); *B01D 53/0423* (2013.01); *B01D 53/0462* (2013.01); *B01D 53/0473* (2013.01); *B01D 69/147* (2013.01); *B01J 20/3078* (2013.01); *C01B 37/02* (2013.01); *C01B 39/48* (2013.01); *B01D 2253/108* (2013.01); *B01D 2256/245* (2013.01); *B01D 2257/102* (2013.01); *B01D 2257/504* (2013.01); *Y02C 10/08* (2013.01)

(58) Field of Classification Search
  CPC .... B01D 53/02; B01D 53/04; B01D 53/0423; B01D 53/047; B01D 53/0473; B01D 2253/108; B01D 2256/245; B01D 2257/102; B01D 2257/504; B01J 20/3078; C01B 37/02; C01B 39/48; Y02C 10/08

USPC ........... 95/90, 96, 136, 139, 143, 148, 43, 47, 95/49, 51; 423/700; 502/77, 85
See application file for complete search history.

(56) References Cited

U.S. PATENT DOCUMENTS

| | | | | |
|---|---|---|---|---|
| 4,698,217 A * | 10/1987 | Valyocsik | ...................... | 423/706 |
| 5,039,641 A | 8/1991 | Vansant et al. | | |
| 5,200,377 A * | 4/1993 | Zones et al. | .................... | 502/62 |
| 5,425,933 A | 6/1995 | Nakagawa | | |
| 6,051,517 A | 4/2000 | Funke et al. | | |
| 6,767,384 B1 | 7/2004 | Vu et al. | | |
| 7,255,725 B2 | 8/2007 | Chau et al. | | |
| 8,067,327 B2 | 11/2011 | Li et al. | | |
| 2006/0079725 A1 | 4/2006 | Li et al. | | |
| 2006/0169142 A1 | 8/2006 | Rode et al. | | |
| 2008/0105627 A1 | 5/2008 | Isomura | | |
| 2008/0282884 A1 | 11/2008 | Kelley et al. | | |
| 2008/0282885 A1* | 11/2008 | Deckman et al. | ................. | 95/98 |
| 2008/0282886 A1 | 11/2008 | Reyes et al. | | |
| 2008/0282892 A1 | 11/2008 | Deckman et al. | | |
| 2009/0007780 A1 | 1/2009 | Yajima et al. | | |
| 2009/0111959 A1 | 4/2009 | Cao et al. | | |
| 2010/0018926 A1* | 1/2010 | Liu et al. | ........................ | 210/655 |
| 2011/0094380 A1* | 4/2011 | Li et al. | ............................ | 95/51 |
| 2011/0146606 A1 | 6/2011 | Cannella | | |
| 2014/0157984 A1* | 6/2014 | Deckman et al. | ................. | 95/49 |
| 2014/0161717 A1* | 6/2014 | Johnson et al. | ............... | 423/704 |

FOREIGN PATENT DOCUMENTS

EP         0255770 A2     2/2008

OTHER PUBLICATIONS

Himeno et al., "Methane and Carbon Dioxide Adsorption on the All-Silica DD3R Zeolite", ZMPC2006, p. 2036 (2006).

Himeno et al., "Characterization and selectivity for methane and carbon dioxide adsorption on the all-silica DD3R zeolite", Microporous and Mesoporous Materials, Jan. 5, 2007, pp. 62-69, vol. 98, issues 1-3, ScienceDirect, Elsevier.

Olson et al, "Light hydrocarbon sorption properties of pure silica Si-CHA and ITQ-3 and high silica ZSM-58", Microporous and Mesoporous Materials, 2004, pp. 27-33, vol. 67, Science Direct, Elsevier Inc.

Zheng et al, "Synthesis, characterization, and modification of DDR membranes grown on alpha-alumina supports", Journal of Materials Science, 2008, pp. 2499-2502, vol. 43, Springer Science+Business Media, LLC.

(Continued)

*Primary Examiner* — Frank Lawrence
(74) *Attorney, Agent, or Firm* — Larry E. Carter; David M. Weisberg; Andrew T. Ward

(57) ABSTRACT

Methods are provided for forming zeolite crystals suitable for gas phase separations with transport characteristics that are stable over time. The zeolitic materials and/or corresponding methods of synthesis or treatment described herein provide for improved stability in the early stages of process operation for some types of gas phase separations. The methods allow for synthesis of DDR type zeolites that have reduced contents of alkali metal impurities. The synthetic methods for reducing the non-framework alkali metal atom or cation impurity content appear to have little or no impact on the DDR crystal structure and morphology.

10 Claims, 4 Drawing Sheets

(56) References Cited

OTHER PUBLICATIONS

Den Exter et al, "Separation of Permanent Gases on the All-Silica 8-Ring Clathrasil DD3R", Zeolites and Related Microporous Materials: State of the Art 1994, Studies in Surface Science and Catalysis, 1994, pp. 1159-1166, vol. 84, Elsevier Science B.V.

Tomita et al, "Gas separation characteristics of DDR type zeolite membrane," Microporous and Mesoporous Materials, 2004, pp. 71-75, vol. 68, Science Direct, Elsievier Inc.

Potapova, "Synthesis and characterization of the DDR type zeolite" (Master Thesis), Lulea University of Technology, Department of Chemical Engineering and Geosciences, Division of Chemical Technology, Jun. 2007.

International Search Report with Written Opinion for PCT/US2013/069060 dated Apr. 8, 2014.

Ernst et al., "Hydrothermalsynthese des Zeoliths ZSM-58 and templatfreie Synthese von Zeolith ZSM-5", Chemie Ingenieur Technik, Jul. 1, 1991, vol. 63, No. 7, pp. 748-750.

Kumita et al., "Shape selective methanol to olefins over highly thermostable DDR catalysts", Applied Catalysis A: General, Jul. 13, 2010, vol. 391, No. 1, pp. 234-243, Elsevier.

International Search Report with Written Opinion for PCT/US2013/069073 dated May 6, 2014.

Office Action from related U.S. Appl. No. 14/074,860 dated Jan. 13, 2015.

* cited by examiner

DDR TYPE ZEOLITES WITH STABILIZED ADSORPTION

CROSS-REFERENCE TO RELATED APPLICATIONS

This application claims the benefit of U.S. Application Ser. No. 61/734,010, filed on Dec. 6, 2012; which is incorporated by reference herein in its entirety. This application is also related to U.S. Application Ser. Nos. 61/734,007 and 61/734,012, also filed on Dec. 6, 2012, and the two other co-pending U.S. utility patent applications filed on even date herewith and claiming priority thereto, respectively, all of which are hereby incorporated by reference herein in their entirety.

FIELD OF THE INVENTION

Zeolites with stabilized adsorption activity are described along with methods for preparing the same.

BACKGROUND OF THE INVENTION

Zeolite crystal structures have found a wide range of applications within refinery processes and other processes for manipulating petroleum streams. Some zeolite applications are catalytic in nature, while other applications focus on the ability of zeolites to selectively adsorb molecules within a gas stream.

One example of selective adsorption of molecules from a gas phase stream is using a zeolite or another microporous material to remove contaminants from a stream containing hydrocarbons or other small gas phase organic molecules. For example, many natural gas streams contain at least some $CO_2$ in addition to the desired $CH_4$. Additionally, many refinery processes generate a gas phase output that includes a variety of species, such as $CH_4$ and $CO_2$, that are gases at standard temperature and pressure. Performing a separation on a gas phase stream containing $CH_4$ can allow for removal of an impurity and/or diluent such as $CO_2$ or $N_2$ under controlled conditions. Such an impurity or diluent can then be directed to other processes, such as being directed to another use that reduces the loss of greenhouse gases to the environment.

U.S. Patent Application Publication No. 2008/0282885 describes systems and methods for removing $CO_2$, $N_2$, or $H_2S$ using a swing adsorption process. One type of adsorbent that can be used in the swing adsorption process is an 8-ring zeolite, such as a DDR type zeolite.

SUMMARY OF THE INVENTION

In one aspect, a method for performing a gas separation is provided. The method includes contacting an adsorbent or membrane comprising DDR-type zeolite crystals with an input gas stream containing a first component and a second component to form a first gas stream enriched in the first component relative to the input gas stream; and collecting a second gas stream comprising the second component, the second gas stream being enriched in the second component relative to the input gas stream, wherein the DDR-type zeolite crystals can be synthesized using a synthesis mixture having an alkali metal to silica ratio of at least about 0.01, the adsorbent being comprised of crystals with an alkali metal impurity content of about 0.05 wt % or less.

In another aspect, a method for preparing an adsorbent or membrane based on DDR-type crystals is provided. The method includes forming DDR-type crystals from a synthesis mixture comprising an alkali metal cation, an oxide of aluminum, an oxide of silicon, an organic cation of a methyltropinium salt, and water; separating the DDR-type crystals from the synthesis mixture; calcining the DDR-type crystals; exposing the DDR-type crystals to an acidic solution under effective ion exchange conditions to reduce the content of alkali metal impurities in the DDR-type crystals; calcining the ion exchanged DDR-type crystals having a reduced content of alkali metal impurities; and forming an adsorbent or membrane based on the ion exchanged DDR-type crystals.

DETAILED DESCRIPTION OF THE EMBODIMENTS

Overview

Figure 1:
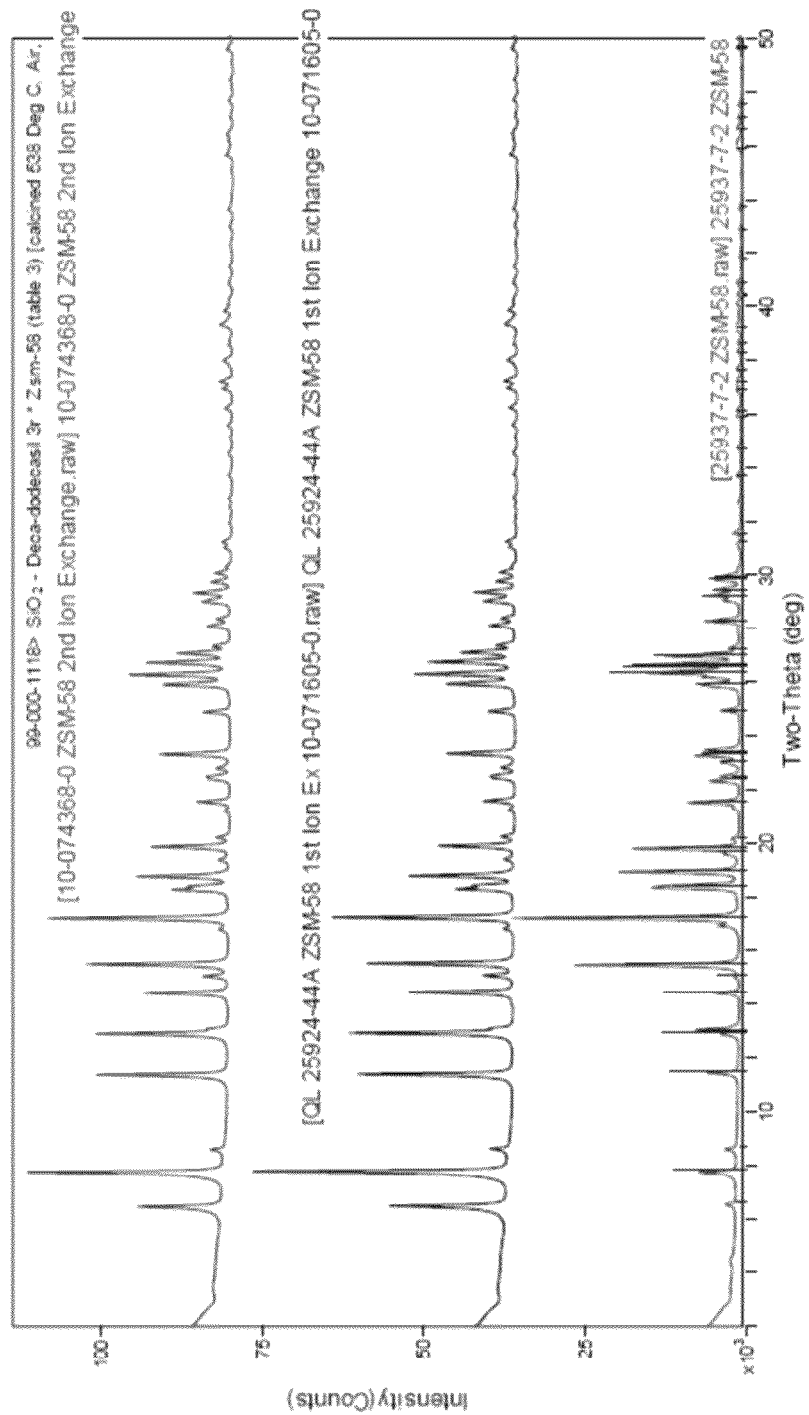
FIG. 1 shows X-ray diffraction spectra of ZSM-58 crystals.

In various aspects, methods are provided for forming zeolite crystals suitable for gas phase separations with transport characteristics that are relatively stable over time. In a refinery setting, natural gas processing setting, or other commercial setting, a desirable feature of an industrial process can be to have a process that is relatively stable over time. For example, stability for a swing adsorption process means that the swing adsorption process can be repeated over time while achieving comparable results during each cycle and/or achieve results that vary in a predictable manner between cycles. Such a process can operate in a stable manner, potentially allowing both for predictability during an individual process cycle and for predictability in how to modify the process over time to maintain a desired result. In various embodiments, the processes described herein can be applicable to zeolites used in membrane separation processes as well as swing adsorption separation processes.

The zeolitic materials and/or corresponding methods of synthesis or treatment described herein can provide for improved stability in the early stages of process operation for some types of gas phase separations.

One group of zeolitic materials suitable for use in gas phase separations includes DDR type zeolites. DDR type zeolites include crystalline materials that are isotypes of the DDR structure, such as ZSM-58, Sigma-1, and/or SSZ-28 zeolites. During synthesis of DDR type zeolites, an alkali metal cation (such as sodium and/or potassium) can often be included as part of the synthesis formulation. A portion of the alkali metal cations can be incorporated into the framework of the zeolite to provide charge balance. However, such a synthesis can typically also result in incorporation of non-framework alkali metal atoms/cations into the zeolite. These additional non-framework alkali metal atoms/cations can be referred to as alkali metal impurities in the zeolite. Such non-framework alkali metal atoms/cations can also be found in other zeolitic adsorbents, such as MFI, CHA, and the like.

Without being bound by any particular theory, it is believed that alkali metal impurities in a DDR type or other zeolite have a significant impact on the adsorption isotherm. The magnitude of the impact on the adsorption isotherm can depend on the molecular species. For example, for DDR non-framework alkali metal cations, the impact on the adsorption isotherm of $CO_2$ can be greater than the impact on the adsorption isotherm for $CH_4$. However, the potential adsorption sites associated with the alkali metal impurities can be poisoned or otherwise passivated. As a result, the alkali metal impurities can result in large amounts of process variability during the early stages of operation of a reactor for a gas phase adsorption process. For example, when a DDR type zeolite adsorbent is relatively fresh, the non-framework alkali metal atom or cation sites are typically not passivated or are not passivated to a large extent. These sites can therefore be active for adsorption, resulting in an apparently greater adsorption capacity and/or activity for the adsorbent. However, this apparent additional capacity can be quickly lost due to poisoning of the alkali metal impurity sites by foulants such as $H_2S$. As a result, the adsorption capacity of the zeolite adsorbent can quickly drop after the start of an adsorption process. For a zeolite structure containing about 0.25 wt % of alkali metal impurities, the change in adsorption capacity between adsorption for the fresh zeolite and the steady state adsorption can be as much as ~30%. This can represent an undesirable level of change for processing of a natural gas feed or in a refinery process.

In order to reduce this undesirable process variability, synthesis methods are provided herein for synthesizing DDR type zeolites that can have reduced contents of alkali metal impurities. The synthetic methods for reducing the non-framework alkali metal atom or cation impurity content appear to have little or no impact on the DDR crystal structure/morphology. As an alternative, methods are also provided for passivating an adsorbent having a DDR crystal structure prior to use.

Separation Processes

This invention can be applicable to membrane as well as swing adsorption processes. Membranes can be formed from adsorbent materials. For example, hydrothermal synthesis processes can produce zeolite membranes. Zeolites can also be incorporated into mixed matrix membranes. In a membrane separation process, a flow of a feed mixture (typically in the gas phase) can be passed over one side of the membrane. The membrane can selectively transport some species to the opposite side of the membrane, which either can be at a lower pressure or can be purged. The species preferentially transported through the membrane is referred to as the heavy component, and the species preferentially retained on the feed side is referred to as the light component (regardless of their relative molar masses). A transport rate of molecules through the membrane can be determined by kinetics and equilibrium adsorption. Mitigating changes in equilibrium adsorption properties by eliminating non-framework alkali metal atoms/cations can reduce changes in the operating characteristic of the membrane. Changes in the operating characteristics can include, but are not necessarily limited to, flux through the membrane and recovery of the light component. Time dependent changes in these characteristics can generally be undesirable in a membrane separation process.

All swing adsorption processes have an adsorption step in which a feed mixture (typically in the gas phase) is flowed over an adsorbent that preferentially adsorbs a more readily adsorbed component relative to a less readily adsorbed component. A component may be more readily adsorbed because of kinetic or equilibrium properties of the adsorbent. The adsorbent can typically be contained in a contactor that is part of the swing adsorption unit. The contactor can typically contain an engineered structured adsorbent bed or a particulate adsorbent bed. The bed can contain the adsorbent and other materials such as other adsorbents, mesopore filling materials, and/or inert materials used to mitigated temperature excursions from the heat of adsorption and desorption. Other components in the swing adsorption unit can include, but are not necessarily limited to, valves, piping, tanks, and other contactors.

The method of adsorbent regeneration designates the type of swing adsorption process. Pressure swing adsorption (PSA) processes rely on the fact that gases under pressure tend to be adsorbed within the pore structure of the microporous adsorbent materials. Typically, the higher the pressure, the greater the amount of targeted gas component that will be adsorbed. When the pressure is reduced, the adsorbed targeted component is typically released, or desorbed. PSA processes can be used to separate gases of a gas mixture, because different gases tend to fill the micropore or free volume of the adsorbent to different extents due to either the equilibrium or kinetic properties of the adsorbent. Temperature swing adsorption (TSA) processes also rely on the fact that gases under pressure tend to be adsorbed within the pore structure of the microporous adsorbent materials. When the temperature of the adsorbent is increased, the adsorbed gas is typically released, or desorbed. By cyclically swinging the temperature of adsorbent beds, TSA processes can be used to separate gases in a mixture when used with an adsorbent selective for one or more of the components in a gas mixture. Partial pressure purge displacement (PPSA) swing adsorption processes regenerate the adsorbent with a purge. Rapid cycle (RC) swing adsorption processes complete the adsorption step of a swing adsorption process in a short amount of time. For kinetically selective adsorbents, it can be preferable to use a rapid cycle swing adsorption process. If the cycle time becomes too long, the kinetic selectivity can be lost. These swing adsorption protocols can be performed separately or in combinations. Examples of processes that can be used in combination are RCPSA, RCTSA, PTSA, and PPTSA. Mitigating changes in equilibrium adsorption properties by eliminating non-framework alkali metal atoms or cations can reduce changes in the operating characteristics of swing adsorption processes. Changes in the operating characteristics can include recovery of the light component and composition of the streams enriched in the light and heavy components. Time dependent changes in these characteristics can be undesirable in swing adsorption separation processes.

Swing adsorption processes can be applied to remove a variety of target gases from a wide variety of gas mixtures. The "light component" as utilized herein is taken to be the species or molecular component(s) that are not preferentially taken up by the adsorbent in the adsorption step of the process. Conversely, the "heavy component" as utilized herein is taken to be the species or molecular component(s) that are preferentially taken up by the adsorbent in the adsorption step of the process. These distinctions are made herein independent of the relative weights of the two components—for instance, it is possible for the light component to have a greater molecular weight than the heavy component.

The adsorbent purification methods described herein can provide an improvement for the fouling tolerance of the adsorbent. The improved fouling tolerance can provide a corresponding improvement in the operational stability for equilibrium and kinetically controlled swing adsorption processes and/or membrane separation processes. In kinetically controlled swing adsorption processes, at least a portion (and preferably a majority) of the selectivity can be imparted, e.g., due to the transport diffusion coefficient in the micropores and free volume of the adsorbent of the light species being less than that of the heavier species. Also, in kinetically controlled swing adsorption processes with microporous adsorbents, such as 8-member ring zeolite adsorbents, the diffusional selectivity can arise from diffusion differences in the micropores of the adsorbent and/or from a selective diffusional surface resistance in the crystals or particles that make-up the adsorbent. Kinetically controlled swing adsorption processes are typically in contrast to equilibrium controlled swing adsorption processes, where the equilibrium adsorption properties of the adsorbent control selectivity. The improvement in the kinetic selectivity can be such that the total recovery of the light component achieved in the swing adsorption process can be greater than about 80 mol %, e.g., greater than about 85 mol %, greater than about 90 mol %, or greater than about 95 mol %, of the content of the light component introduced into the process. Recovery of the light component is defined as the time averaged molar flow rate of the light component in the product stream divided by the time averaged molar flow rate of the light component in the feedstream. Similarly, recovery of the heavy component is defined as the time averaged molar flow rate of the heavy component in the product stream divided by the time averaged molar flow rate of the heavy component in the feedstream.

It is-possible to remove two or more contaminants simultaneously, but, for convenience, the component(s) to be removed by selective adsorption is(are) typically referred to herein in the singular and as a contaminant or heavy component.

The methods to purify the adsorbent described herein can provide an improvement that can stabilize the operation of swing adsorption process. In various embodiments, the methods to purify the adsorbent can allow the adsorbent to become more fouling tolerant.

Adsorbent Contactors and Beds

The term "adsorbent contactor," as utilized herein, includes both structured and unstructured adsorbent contactors. The adsorbent contactor is the portion of the swing adsorption unit where the feed gas is contacted with the adsorbent. In a TSA process, the contactor may contain a means to heat and cool the adsorbent, such as heating and cooling channels. Each contactor can contain one or more adsorbent beds. Beds are sections or portions of the contactor that contain adsorbent. Each bed can contain a single adsorbent or a mixture of different adsorbents. All beds in a contactor do not have to contain the same adsorbent.

In some embodiments, the bed in the contactor comprises a packing that contains at least solid inert particles and pellets containing an adsorbent. The inert particles can be incorporated into the bed to help manage heat of adsorption and desorption. The pellets containing the adsorbent can typically comprise adsorbent particles, pores, and a binder. Pellets can often be formed in spray drying or extrusion processes. Inert particles can typically have dimensions ranging from about 100 microns to about 10 cm, but any suitable particle size can be used, depending on the desired design. Pellets containing the adsorbent can typically have dimensions ranging from about 250 microns to about 1 cm, but again any suitable particle size can be used, depending on the desired design. Mass transfer can be improved by using smaller sized pellets; however, pressure drop through the bed can tend to increase with decreasing size.

One example of an engineered adsorbent contactor is a parallel channel contactor, which can be suitable for use in a variety of swing adsorption processes. The bed structure for an adsorbent contactor composed of parallel channel contactors can include fixed surfaces on which the adsorbent or other active material is held. Parallel channel contactors can provide significant benefits over conventional gas separation methods, such as vessels containing adsorbent beads or extruded adsorbent particles. "Parallel channel contactors" are defined herein as a subset of adsorbent contactors comprising structured (engineered) adsorbents in beds with substantially parallel flow channels. These flow channels may be formed by a variety of means. In addition to the adsorbent material, the bed structure may contain one or more items such as, but not limited to, support materials, heat sink materials, and void reduction components.

In a swing adsorption apparatus with parallel contactor channels, the walls of the channels in the beds can contain the adsorbent, for example uniform sized 8-ring zeolite crystals. The beds in the contactor may optionally contain a thermal mass (heat transfer) material to help control heating and cooling of the adsorbent of the contactor during both the adsorption and desorption steps of a pressure swing adsorption process. Heating during adsorption can be caused by the heat of adsorption of molecules entering the adsorbent. The optional thermal mass material can also help control cooling of the contactor during the desorption step. The thermal mass can be incorporated into the flow channels of the beds in the contactor, incorporated into the adsorbent itself, and/or incorporated as part of the wall of the flow channels. When it is incorporated into the adsorbent, it can be a solid material distributed throughout the adsorbent layer and/or it can be included as a layer within the adsorbent. When it is incorporated as part of the wall of the flow channel, the adsorbent can be deposited or formed onto the wall. Any suitable material can be used as the thermal mass material in the practice of the present invention. Non-limiting examples of such materials include metals, ceramics, and polymers. Non-limiting examples of preferred metals include steel, copper, and aluminum alloys. Non-limiting examples of preferred ceramics include silica, alumina, and zirconia. An example of a preferred polymer that can be used in the practice of the present invention is a polyimide.

Depending upon the degree to which the temperature rise is to be limited during the adsorption step, the amount of thermal mass material used can range from about 0.1 to about 25 times the mass of the microporous adsorbent of the contactor, e.g., from about 0.25 to 5 times the mass, from about 0.25 to 2 times the mass, or from about 0.25 to 1 times the mass. In a preferred embodiment, an effective amount of thermal mass can be incorporated into the contactor. The effective amount of thermal mass can be an amount sufficient to maintain the thermal rise of the adsorbent during the adsorption step to less than about 100° C., e.g., less than about 50° C. or less than about 10° C.

Channels in contactors, also sometimes referred to as "flow channels" or "gas flow channels", are paths in the contactor that allow gas flow through. Generally, flow channels can provide for relatively low fluid resistance coupled with relatively high surface area. Flow channel length can advantageously be sufficient to provide the mass transfer zone, which length can be at least a function of the fluid velocity and of the surface area to channel volume ratio. The channels can be configured to minimize pressure drop along the length of channels. In many embodiments, a fluid flow fraction entering a channel at the first end of the contactor does not communicate with any other fluid fraction entering another channel at the first end until the fractions recombine after exiting at the second end. In parallel channel contactors, channel uniformity can be important in the beds to ensure that (substantially all of) the channels are being effectively utilized and that the mass transfer zone is substantially equally contained. Both productivity and gas purity can suffer if there is excessive channel inconsistency. If one flow channel is larger than an adjacent flow channel, premature product break through may occur, which can lead to a reduction in the purity of the product gas, in some cases to unacceptable purity levels. Moreover, devices operating at cycle frequencies greater than about 50 cycles per minute (cpm) can require greater flow channel uniformity and less pressure drop than those operating at lower cycles per minute. Further, if too much pressure drop occurs across the bed, then higher cycle frequencies, such as on the order of greater than 3 cpm, may not readily be achieved.

The dimensions and geometric shapes of the beds in parallel channel contactors can include any suitable for use in swing adsorption process equipment. Non-limiting examples of geometric shapes include various shaped monoliths having a plurality of substantially parallel channels extending from one end of the monolith to the other; a plurality of tubular members; stacked layers of adsorbent sheets with and without spacers between each sheet; multi-layered spiral rolls; bundles of hollow fibers; as well as bundles of substantially parallel solid fibers. The adsorbent can be coated onto these geometric shapes or the shapes can, in many instances, be formed directly from the adsorbent material plus suitable binder. An example of a geometric shape formed directly from the adsorbent/binder can be extrusion of a zeolite/polymer composite into a monolith. Another example of a geometric shape formed directly from the adsorbent can be extruded or spun hollow fibers made from a zeolite/polymer composite. An example of a geometric shape coated with the adsorbent can be a thin flat steel sheet coated with a microporous, low mesopore, adsorbent film, such as a zeolite film. The directly formed or coated adsorbent layer can be itself structured into multiple layers or the same or different adsorbent materials. Multi-layered adsorbent sheet structures are described, for example, in U.S. Patent Application Publication No. 2006/0169142, which is incorporated by reference herein.

The dimensions of the flow channels can be computed from considerations of pressure drop along the flow channel. It can be preferred for the flow channels to have a channel gap from about 5 microns to about 1 mm, e.g., from about 50 microns to about 250 microns. As utilized herein, the "channel gap" of a flow channel is defined as the length of a line across the minimum dimension of the flow channel as viewed orthogonal to the flow path. For instance, if the flow channel is circular in cross-section, then the channel gap is the internal diameter of the circle. However, if the channel gap is rectangular in cross-section, the flow gap is the distance of a line perpendicular to and connecting the two longest sides of the rectangle (i.e., the length of the smallest side of the rectangle). It should also be noted that the flow channels can be of any cross-sectional configuration. In some preferred embodiments, the flow channel cross-sectional configuration can be circular, rectangular, square, or hexagonal. However, any geometric cross-sectional configuration may be used, such as but not limited to, ellipses, ovals, triangles, various polygonal shapes, or even irregular shapes. In other preferred embodiments, the ratio of the adsorbent volume to flow channel volume in the adsorbent contactor can be from about 0.5:1 to about 100:1, e.g., from about 1:1 to about 50:1.

In some applications, the flow channels can be formed by laminating adsorbent sheets together. Typically, adsorbent laminate applications can have flow channel lengths from about 0.5 centimeter to about 10 meters, e.g., from about 10 cm to about 1 meter, and a channel gap of about 50 microns to about 450 microns. The channels may contain a spacer or a mesh that acts as a spacer. For laminated adsorbents, spacers can be used, which are structures or materials that define a separation between adsorbent laminates. Non-limiting examples of the type of spacers that can be used in the present invention include those comprised of dimensionally accurate: plastic, metal, glass, or carbon mesh; plastic film or metal foil; plastic, metal, glass, ceramic, or carbon fibers and threads; ceramic pillars; plastic, glass, ceramic, or metal spheres, or disks; or combinations or composites thereof. Adsorbent laminates have been used in devices operating at PSA cycle frequencies up to at least about 150 cpm. The flow channel length may be correlated with cycle speed. At lower cycle speeds, such as from about 20 cpm to about 40 cpm, the flow channel length can be as long as one meter or more, even up to about 10 meters. For cycle speeds greater than about 40 cpm, the flow channel length can typically be decreased and may vary, e.g., from about 10 cm to about 1 meter. Longer flow channel lengths can be used for slower cycle PSA processes. RCTSA processes tend to be slower than RCPSA processes, and, as such, longer flow channel lengths can also be used with TSA processes.

Gas Feeds

The separation methods described herein can be used to perform separations on a variety of gas phase feeds. One example of a gas phase feed includes a natural gas feed or stream, such as a natural gas feed produced at a petroleum production site, or a natural gas feed or stream from a gas field or shale gas formation. Natural gas feeds typically contain methane, optionally some larger hydrocarbons such as $C_2$-$C_4$ hydrocarbons, $CO_2$, and optionally one or more additional components such as $N_2$, $H_2S$, $H_2O$, and mercaptans. A natural gas feed may also contain one or more substances introduced as part of the process for extracting the natural gas at the production site. Non-limiting examples of such substances can include glycols such as ethylene glycol, amines such as methyl diethyl amine, dimethyl disulfide, and combinations thereof.

Improvements in the recovery of the light component created by selectivation of adsorbents or membranes can be valuable for processes used to remove impurities from natural gas streams, particularly high pressure natural gas streams. It can be desirable to recover the impurities, also referred to as the "heavy component(s)", and the methane-rich product, also referred to as the "light component", at as high a pressure as practical for operability in natural gas processing. Depending on the embodiment, a swing adsorption process using a selectivated adsorbent can be used to obtain methane recovery of greater than about 80 mol %, e.g., greater than about 85 mol %, greater than about 90 mol %, or greater than about 95 mol %, even when the natural gas is fed at relatively high inlet pressures, such as greater than about 50 psig (about 350 kPag), e.g., at least about 150 psig (about 1.0 MPag), at least about 450 psig (about 3.1 MPag), at least about 600 psig (about 4.1 MPag), or at least about 1200 psig (about 8.3 MPag). The composition of natural gas streams directly from an underground field (raw natural gas) can vary from field to field. In order to produce a gas that can be introduced into a pipeline for sale to residential and commercial fuel markets contaminants, such as $N_2$, Hg, mercaptans, and acid gases $CO_2$ and $H_2S$, should be removed to acceptable levels. The levels and impurity types vary from gas field to gas field and, in some cases, can comprise the majority of molecules in the produced gas. For example, it is not uncommon for some natural gas fields to contain from about 0 to about 90 mol % $CO_2$, more typically from about 10 mol % to about 70 mol % $CO_2$.

Other examples of suitable gas phase feeds can include a flue gas and/or a fuel gas from a refinery process. A variety of processes can generate a flue gas and/or fuel gas including $CO_2$ and small hydrocarbons such as $CH_4$. Depending on the source of the flue/fuel gas, it/they may also contain $H_2S$, $H_2$, $N_2$, $H_2O$, and/or other components that are gas phase at standard conditions. Components such as $CO_2$ and $N_2$ can act as diluents reducing the value of such flue gas and/or fuel gas streams.

In order to improve the value of a gas phase stream, a separation can be performed to generate at least two product streams. A first product stream corresponding to the light component can be enriched in a desired product, such as $CH_4$ and/or other hydrocarbons, such as other hydrocarbons generally, other hydrocarbons containing 4 or fewer carbon atoms, or other hydrocarbons containing 3 or fewer carbon atoms. Preferably, the other hydrocarbon can include at least one saturated carbon-carbon bond. A second product stream corresponding to the heavy component can be enriched in one or more rejected components, such as $CO_2$ and/or $N_2$.

One method for performing a separation can be to expose an input stream to an adsorbent material that can preferentially or selectively adsorb one or more components of a gas phase stream. Differences in adsorption can be due to either equilibria or kinetics. Differences in equilibria can be reflected in competitive adsorption isotherms and/or can be estimated from single component isotherms. Differences in kinetics can be reflected in diffusion coefficients. Processes in which a substantial portion of the selectivity arises from differences in kinetics are typically referred to as kinetic separations. For kinetic separations, the time of the adsorption step can preferably be short enough for the adsorbent not to equilibrate with the feed stream. As an example, relatively large pore (>5 Å average pore size) cationic zeolites can have an equilibrium selectivity allowing $CO_2$ to be adsorbed in preference to $CH_4$, while relatively small pore (<3.8 Å average pore size) cationic zeolites can have a kinetic selectivity allowing $CO_2$ to be adsorbed in preference to $CH_4$. A contactor made using a zeolite adsorbent can be used to selectively adsorb $CO_2$ from an input gas stream containing $CO_2$ and $CH_4$, resulting in an output stream enriched in $CH_4$. For a kinetic adsorbent, the time of the adsorption step can be set by the zeolite crystal size and the $CH_4$ diffusion coefficient. Regeneration of such a kinetic adsorbent can be done with a pressure swing, a temperature swing, a purge, and/or displacement. Use of a kinetic adsorbent that weakly adsorbs $CO_2$ (i.e., relatively flat adsorption isotherm) can facilitate regeneration. Highly siliceous zeolites (Si/Al ratio >~100) can often have these types of weak isotherms. A regeneration process can typically generate a stream enriched in $CO_2$ and depleted in hydrocarbons such as $CH_4$.

One consideration in choosing an adsorbent zeolite (or other adsorbent material) can be selectivity for a desired separation. Unless otherwise noted, the term "swing adsorption selectivity" as used herein is based on binary (pairwise) comparison of the molar concentration of components in a feed stream and the total number of moles of these components adsorbed by a particular adsorbent during the adsorption step of a process cycle under the specific system operating conditions and feed stream composition. This swing adsorption selectivity definition can be suitable for a process cycle that is part of a swing adsorption process, such as a type of pressure and/or temperature swing adsorption. In order to define the selectivity, uptake values for components in a feed can be determined. For a feed that contains at least components A and B, the adsorption uptake values for components A and B can be defined as: $U_A$={change in total moles of A in the adsorbent during the adsorption step of the swing adsorption process}/{molar concentration of A in the feed}; and $U_B$={change in total moles of B in the adsorbent during the adsorption step of the swing adsorption process}/{molar concentration of B in the feed}, where $U_A$ represents the adsorption uptake of component A and $U_B$ represents the adsorption uptake of component B.

For a feed containing component A, component B, and optionally one or more additional components, an adsorbent that has a greater "selectivity" for component A than component B can generally have at the end of the adsorption step of a swing adsorption process cycle a greater value for $U_A$ than $U_B$. Thus, the selectivity can be defined as: Swing Adsorption Selectivity=$U_A/U_B$ (for $U_A>U_B$). By removing non-framework alkali metal atoms or cations from the adsorbent, changes in the swing adsorption selectivity in the presence of foulants can be reduced.

Equilibrium selectivity may also be used as a factor in selecting an adsorbent. The methods described herein add kinetic selectivity onto the equilibrium selectivity in a way that can increase the swing adsorption selectivity of the adsorbent. Equilibrium selectivity can be characterized based on long time measurements of transport or based on slow speed cycle performance. For example, for the adsorption at ~40° C. of $CO_2$ using an 8-member ring DDR-type zeolite adsorbent, $CO_2$ can approach an equilibrium level of adsorbed molecules on a time scale (order of magnitude) of about 0.5 seconds to about 10 seconds for ~10 micron sized crystals. For this order of magnitude description, approaching an equilibrium level of adsorption is defined as being within about 5% of the equilibrium adsorption concentration, e.g., within about 2%. For $CH_4$, an equilibrium level of adsorbed molecules can usually be approached on a time scale on the order of tens of seconds. In other words, the equilibrium adsorbed concentration can be approached at a time between about 2 seconds and about 200 seconds. In a swing adsorption process with a relatively fast cycle time, such as a rapid cycle pressure and/or temperature swing adsorption process, the time in the adsorption step can be comparable to (or possibly shorter than) the time scale for $CH_4$ to approach an equilibrium level of adsorbed molecules. As a result, in a swing adsorption process with a cycle time on the order of tens of seconds or less, the adsorption of $CO_2$ and $CH_4$ can be influenced by different factors, e.g., for a 10 micron sized DDR adsorbent. The $CO_2$ adsorption can have characteristics with greater similarity to equilibrium adsorption, as the time scale for the swing adsorption cycle can be long relative to the time scale for equilibration of $CO_2$ adsorption. As a result, purification of the adsorbent can be used to stabilize the selectivity, thereby mitigating changes in $CO_2$ and $CH_4$ adsorption and improving process stability.

Adsorbent Materials

One method for performing a separation can be to expose an input stream to an adsorbent material that can preferentially or selectively adsorb one or more components of a gas phase stream. As an example, an adsorbent material can selectively adsorb $CO_2$ relative to $CH_4$, such that, when a feed gas stream containing $CO_2$ and $CH_4$ is exposed to the adsorbent material, $CO_2$ can selectively be adsorbed, resulting in an output stream enriched in $CH_4$. After a period of time, the adsorbent material can be regenerated by releasing adsorbed compounds in processes such as PSA, RCPSA, TSA, RCTSA, and/or PPSA, which can generate a stream enriched in $CO_2$.

An example of an adsorbent suitable for performing this type of separation can be a DDR type zeolite, such as ZSM-58, Sigma-1, or SSZ-28. Such 8-member ring zeolite materials can have a Si/Al ratio of at least 10:1, e.g., at least 50:1 or at least 100:1. Additionally or alternatively, such 8-member ring zeolite materials can have a Si/Al ratio less than about 10000:1, e.g., about 5000:1 or less, about 3000:1 or less, about 2000:1 or less, about 1500:1 or less, or about 1000:1 or less.

8-member ring zeolites like DDR can typically have pore channels with a window (pore) size on the order of 3-4 Angstroms. For example, the window (pore) size for a DDR type zeolite is about 3.65 Angstroms. Molecules such as $CO_2$ and/or $N_2$, with a relatively linear configuration, can diffuse more rapidly in a pore with such a window size as compared to bulkier molecules, such as methane. 8-ring zeolite materials can allow $CO_2$ to be rapidly transmitted into the zeolite crystals while hindering the transport of methane, making it possible to selectively separate $CO_2$ from a mixture of $CO_2$ and methane. At temperatures below ~100° C., the single component diffusion coefficient of $CO_2$ can be more than a hundred times greater than that of methane. From the measured activation energies of the diffusion coefficients, at temperatures up to about 300° C., the diffusion coefficient of $CO_2$ can be calculated to be more than five times greater than that of methane.

DDR-type zeolites suitable for use herein can allow $CO_2$ to access the internal pore structure through 8-ring windows in a manner such that the ratio of the effective single component diffusion coefficients of $CO_2$ and methane (i.e., $D_{CO2}/D_{CH4}$) can be greater than 10, e.g., greater than about 50, greater than about 100. Single component diffusion coefficients (for example, those of $CO_2$ and $CH_4$) can be substituted for transport diffusion coefficients measured for a pure gas in the Henry's law regime of the adsorption isotherm for the adsorbent. The loading of molecules in the unselectivated adsorbent (e.g., zeolite) can be low in the Henry's law regime, and, in this regime, the Fickian and Stephan-Maxwell diffusion coefficients can be nearly equal. The effective diffusivity of a porous crystalline material for a particular sorbate can be conveniently measured in terms of its diffusion time constant, $D/r^2$, wherein D is the Fickian diffusion coefficient (m²/s) and the value "r" is the radius of the crystallites (m) characterizing the diffusion distance. In situations where the crystals are not of uniform size and geometry, "r" represents a mean radius representative of their corresponding distributions. One way to measure the time constant and diffusion coefficient can be from analysis of standard adsorption kinetics (i.e., gravimetric uptake) using methods described by J. Crank in "The Mathematics of Diffusion", 2nd Ed., Oxford University Press, Great Britain, 1975. Another way to measure the time constant and diffusion coefficient can be from analysis of zero length chromatography data using methods described by D. M. Ruthven in "Principles of Adsorption and Adsorption Processes", John Wiley, NY (1984) and by J. Karger and D. M. Ruthven in "Diffusion in Zeolites and Other Microporous Solids", John Wiley, NY (1992). A preferred way to measure the time constant and diffusion coefficient can employ a frequency response technique described by Reyes et al. in "Frequency Modulation Methods for Diffusion and Adsorption Measurements in Porous Solids", *J. Phys. Chem. B.*, 101, pages 614-622, 1997.

Besides having a kinetic selectivity, the 8-ring DDR-type zeolites identified above can also exhibit equilibrium selectivity for $CO_2$ compared to methane. The purification processes described herein can help prevent/reduce/minimize changes in this equilibrium selectivity in an operating separation unit. In an equivalent manner, the purification processes described herein can help stabilize the equilibrium selectivity of other zeolite adsorbents.

Synthesis of DDR-Type Zeolites

ZSM-58 can be prepared from a reaction mixture containing sources of an alkali or alkaline earth metal (M) cation; an oxide of aluminum; an oxide of silicon; an organic cation (R) of a methyltropinium salt such as a halide, hydroxide, or sulfate; and water. For example, a reaction mixture for forming ZSM-58 can include sodium hydroxide (NaOH), sodium aluminate ($NaAlO_3$), silicon oxide ($SiO_2$), methyltropinium iodide (potentially referred to as MTI), and water ($H_2O$). Suitable molar ratios for the various components in the reaction mixture can include: a $SiO_2$ to $Al_2O_3$ molar ratio from 1-2500, such as from 50-1500; an $H_2O$ to $SiO_2$ molar ratio from 5-200, such as from 10-100; an $OH^-$ to $SiO_2$ molar ratio from 0-2.0, such as from 0.01-2.0 or from 0.1-1.0; an alkali/alkaline earth metal (M) to $SiO_2$ molar ratio from 0.01-3.0, such as from 0.10-1.0; and a organic cation (R) to $SiO_2$ molar ratio from 0.01-2.0, such as from 0.10 to 1.0 or from 0.10-0.50. Optionally, still higher molar ratios of $SiO_2$ to $Al_2O_3$ may be used, so that the alumina content of the resulting zeolite crystals approaches or is zero. It is noted that the silica to alumina molar ratio is essentially an $Si/Al_2$ molar ratio and can be calculated on the basis of the silicon-containing and aluminum-containing components being $SiO_2$ and $Al_2O_3$, respectively, even though other non-oxide sources of those components may be used.

Crystallization of the ZSM-58 can be carried out at either static or stirred conditions in a suitable reactor vessel (e.g., in a polypropylene jar or a Teflon™-lined or stainless steel autoclave). The total useful range of temperatures for crystallization can extend from about 80° C. to about 225° C. The temperature can be maintained for a time sufficient for crystallization to occur at the temperature used, e.g., which can range from about 24 hours to about 60 days. Thereafter, the crystals can be separated from the liquid and recovered. The reaction mixture can be prepared utilizing materials which supply the appropriate oxides. Such materials may include, but are not necessarily limited to, sodium silicate, silica hydrosol, silica gel, silicic acid, sodium hydroxide, sodium aluminate, alumina, and the methyltropinium salt directing agent. The methyltropinium salt may be synthesized by selective methylation of 3-tropanol at the bridgehead nitrogen. This salt can have the following formula:

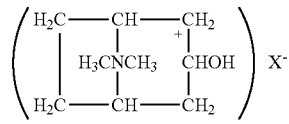

wherein X is an anion, such as, for example, a halide (e.g., iodide, chloride, bromide, or the like, or a combination thereof), nitrate, hydroxide, sulfate, bisulfate, perchlorate, or the like, or a combination thereof.

It should be realized that the reaction mixture components can be supplied by more than one source. The reaction mixture can be prepared either batchwise or continuously. Crystal size and crystallization time of the new crystalline material can vary with the nature of the reaction mixture employed and the crystallization conditions. Optionally, synthesis of the ZSM-58 crystals can be facilitated by the presence of at least about 0.01 wt % (e.g., at least about 0.10 wt % or at least about 1 wt %) seed crystals of crystalline product.

The ZSM-58 crystals generated by the synthesis methods described herein can have any convenient size. A characteristic length (roughly corresponding to a diameter) for the crystals can be from about 1 μm to about 50 μm. For example, a synthesis gel mixture having relative weight ratios of ~7.7 $SiO_2$, ~1.0 NaOH, ~1.8 MTI, ~0.04 $NaAlO_3$, and ~358 $H_2O$ can be heated at about 160° C. to produce crystals having a characteristic length from about 20 ρm to about 50 μm, depending on the crystallization time. For this example, suitable crystallization times can be from about 1 day to about 50 days, e.g., from about 5 days to about 30 days or from about 10 to about 20 days.

Alkali Metal Impurity Exchange of DDR-Type Zeolites

One convenient option for synthesis of DDR-type zeolites can be to use sodium, potassium, and/or another alkali metal in the synthesis mixture. This can allow sodium (or potassium or another alkali metal) to be used as the counterion for some components, such as the aluminum source, and the overall alkali metal concentration can be controlled by using an alkali metal hydroxide or another convenient alkali salt to achieve a desired sodium (or potassium or alkali metal) level.

Although alkali metals can be convenient for use in synthesis of DDR-type zeolites such as ZSM-58, it has been unexpectedly discovered that alkali metal impurities in synthesized DDR-type crystals can increase the apparent adsorption capacity of the zeolite. As noted above, alkali metal impurities refer to alkali metal atoms or cations that are not associated with framework Al atoms for charge balance. The concentration of these excess sodium atoms/ions can be reduced by modifying the procedure for synthesizing the DDR-type crystals.

Typically, zeolite crystals can be formed by first creating a synthesis mixture of components, such as the synthesis mixtures noted above. After heating the synthesis mixture at an effective temperature for an effective period of time, the crystals formed in the synthesis mixture can be separated from the aqueous environment of the mixture, such as by filtration. The crystals can then typically be dried and calcined prior to use. In relatively small batches, for example on a bench scale, the crystals can be calcined at a temperature from about 350° C. to about 925° C. for about 1 minute to about 1 hour, e.g., about 1 minute to about 20 minutes. However, calcination time can often depend upon the amount (e.g., weight and/or volume) being processed at any given time. In relatively large batches, the crystals my need to be calcined for up to 16 hours in order to achieve the same calcination level as in a relatively small batch. To reach the calcination temperature, the temperature of the oven or other device for heating the crystals can be ramped at about 50° C. per hour, about 100° C. per hour, or at another convenient increment. The crystals can optionally be held at incremental temperatures (e.g., every hour, every other hour, etc.) for a period of time prior to continuing to increase the temperature to the desired final calcination temperature. The incremental heating can allow water vapor to exit the crystal structure while reducing/minimizing damage to, and/or morphology changes in, the crystals.

Additionally or alternately, after crystal formation, the crystals can be treated using one or more of several procedures. Once procedure can include filtering, washing with deionized (DI) water, and drying the crystals at a suitable temperature for removing water, such as from about 100° C. to about 140° C.

In some forms, DDR-type crystals can contain organic material(s) that was(were) used as the template/structure directing agent(s). Prior to use as a catalyst or adsorbent, such material can be treated to remove all or part of the organic constituent. This can be conveniently effected by heating such organic-containing crystals at a temperature from about 250° C. to about 550° C., e.g., for from 1 hour to about 48 hours.

The crystalline materials of this invention, when employed either as an adsorbent or as a catalyst, can also be at least partially dehydrated. This can be done by heating to a temperature in the range from 200° C. to about 370° C. in an oxidative or inert atmosphere (such as air or nitrogen, respectively) and at atmospheric, subatmospheric, or superatmospheric pressures, e.g., for between about 30 minutes and about 48 hours. Dehydration can also be performed at room temperature (~20-25° C.) merely by placing the DDR-type crystals in a vacuum, but a longer time may be required to obtain a sufficient amount of dehydration.

In various embodiments, the above procedures can be modified and/or replaced in order to perform an ion exchange procedure in order to reduce the content of sodium or other alkali metal impurities. After heating a synthesis mixture for a sufficient amount of time to form crystals, the crystals in a synthesis mixture can be separated from the aqueous environment of the mixture, such as by filtration. The separated crystals can then be exposed to a water wash. For example, the filtered crystals can be rinsed with water at a temperature between about 20° C. and about 90° C. (such as between about 20° C. and about 70° C.). The volume of water used for the water wash can typically be at least the volume of the corresponding crystals. Optionally, the crystals can also be exposed to an organic wash, such as using acetone, before or after the water wash. The organic wash can be performed at a convenient temperature, such as below about 40° C., with a volume of organic solvent that, like the water, can be at least the volume of the crystals. After the water wash and the optional organic wash, the washed crystals can be filtered to separate them from the wash fluids. After filtration and drying, an initial calcination can be performed on the crystals, such as a calcination as described above. The heating profile for the calcinations can optionally include pauses at incremental temperature values to allow for more thorough drying of the filtered crystals. The crystals can then be exposed to an acidic aqueous environment, such as a 1M solution of acetic acid, ammonium nitrate, or hydrochloric acid. Other suitable acidic solutions can include acidic solutions compatible with the zeolite crystals (i.e., that do not dissolve and/or decrystallize the zeolite), such as other strong acids and organic acids with a pKa value of 6.0 or less, e.g., 5.0 or less. This can allow the alkali metal impurities in the DDR-type zeolites to be exchanged with hydrogen ions from the acidic solution. After the exchange, the crystals can be dried/calcined for a second time prior to use. The acidic solution can have any convenient concentration, so long as an excess of ions are available in solution for exchange with the alkali metal impurities in the crystals. For convenience, the acidic solution can have a concentration of at least about 0.1 M, e.g., at least about 1.0 M.

Other Embodiments

Additionally or alternately, the present invention can include one or more of the following embodiments.

Embodiment 1

A method for performing a gas separation, comprising: contacting an adsorbent or membrane comprising DDR-type zeolite crystals with an input gas stream containing a first component and a second component to form a first gas stream enriched in the first component relative to the input gas stream; and collecting a second gas stream enriched in the second component relative to the input gas stream, wherein the DDR-type zeolite crystals are synthesized using a synthesis mixture having an alkali metal to silica ratio of at least about 0.01, the adsorbent or membrane being comprised of crystals with an alkali metal impurity content of about 0.05 wt % or less, the alkali metal in the synthesis mixture preferably being sodium, the DDR-type zeolite crystals preferably being Sigma-1, ZSM-58, SSZ-28, or a combination thereof.

Embodiment 2

The method of embodiment 1, wherein the DDR-type zeolite crystals as synthesized have an alkali metal impurity content of at least about 0.1 wt %, the alkali metal impurity content being reduced prior to contacting the adsorbent by exposing the DDR-type zeolite crystals to an alkali metal impurity removal process.

Embodiment 3

The method of embodiment 1 or embodiment 2, wherein the adsorbent or membrane comprising DDR-type zeolite crystals is formed by a method comprising: forming DDR-type crystals from a synthesis mixture comprising an alkali metal cation, an oxide of aluminum, an oxide of silicon, an organic cation of a methyltropinium salt which is preferably methyltropinium iodide or chloride, and water; separating the DDR-type crystals from the synthesis mixture; calcining the DDR-type crystals; exposing the DDR-type crystals to an acidic solution under effective ion exchange conditions to reduce the content of alkali metal impurities in the DDR-type crystals; calcining the ion exchanged DDR-type crystals having a reduced content of alkali metal impurities; and forming an adsorbent or membrane based on the ion exchanged DDR-type crystals, the acidic solution preferably being an at least 0.1 M solution of an organic acid having a pKa of about 6 or less.

Embodiment 4

The method of embodiment 3, wherein the zeolite crystals are formed by a method further comprising washing the DDR-type crystals with an organic solvent prior to calcining the DDR-type crystals.

Embodiment 5

The method of embodiment 3 or embodiment 4, wherein the calcined DDR-type crystals have an alumina content of about 0.05 wt % or less, and wherein the calcined ion exchanged DDR-type crystals have a total alkali metal content of about 0.05 wt % or less.

Embodiment 6

The method of any one of embodiments 2-5, wherein a $CO_2$ adsorption isotherm for the DDR-type zeolite crystals as synthesized has an adsorption uptake at least about 0.05 mmol of $CO_2$ per gram of zeolite greater than a $CO_2$ adsorption isotherm for the DDR-type zeolite crystals at a $CO_2$ partial pressure of at least about 40 kPa after the alkali metal impurity removal process.

Embodiment 7

The method of any one of the previous embodiments, wherein the adsorbent is in a swing adsorber unit, the adsorbent adsorbing at least a portion of the second component during the contacting, the swing adsorber unit preferably being a rapid cycle pressure swing adsorber unit or a rapid cycle temperature swing adsorber unit.

Embodiment 8

The method of any of the previous embodiments, wherein the alkali metal in the synthesis mixture comprises sodium.

Embodiment 9

The method of any one of the previous embodiments, wherein the first component comprises $CH_4$, optionally also comprising $H_2S$, or is $CH_4$.

Embodiment 10

The method of any one of the previous embodiments, wherein the second component is $CO_2$, $N_2$, $H_2S$ (if not included in the first component), or a combination thereof.

Embodiment 11

The method of any one of the previous embodiments, wherein the adsorbent or membrane is formed after calcining the ion exchanged DDR-type crystals.

Embodiment 12

The method of any one of the previous embodiments, wherein the synthesis mixture comprises an $SiO_2$ to $Al_2O_3$ ratio from about 1 to about 2500, an $H_2O$ to $SiO_2$ ratio from about 5 to about 200, an $OH^-$ to $SiO_2$ ratio from 0 to about 2.0, an alkali metal to $SiO_2$ ratio from about 0.01 to about 3.0, and a methyltropinium cation to $SiO_2$ ratio from about 0.01 to about 2.0.

Embodiment 13

The method of any one of embodiments 1-6 or 8-12, wherein the first gas stream is a retentate stream and the second gas stream is a permeate stream.

Examples of ZSM-58 Crystals with Reduced Alkali Metal Impurities

Example 1

Crystallinity and Morphology

The process detailed herein can advantageously result in DDR-type zeolite crystals having a reduced content of alkali metal impurities that are otherwise chemically and morphologically similar to conventionally prepared DDR-type zeolite crystals. The similarity of the crystals before and after removal of the sodium impurities can be confirmed by a variety of methods.

In order to demonstrate the similarity of crystals before and after removal of alkali metal impurities, ZSM-58 crystals were synthesized using sodium as an alkali metal in the synthesis mixture. The ZSM-58 crystals were synthesized in the manner described above. Briefly, a mixture for synthesizing ZSM-58 crystals was formulated by combining sodium hydroxide (NaOH), sodium aluminate ($NaAlO_3$), silicon oxide ($SiO_2$), methyltropinium iodide (MTI), and water ($H_2O$). For this initial test, the weight ratio of components in the mixture was ~7.7 $SiO_2$:~1.0 NaOH:~1.8 MTI:~0.04 $NaAlO_3$:~358 $H_2O$. This mixture was maintained at about 160° C. for about 10 days to form ZSM-58 crystals. The crystals were then separated from the formulation mixture and calcined in air at ~538° C. The resulting crystals exhibited a Si:Al$_2$ ratio greater than 1250. The crystals were then analyzed using X-ray diffraction (XRD) and Scanning Electron Microscopy (SEM) to determine crystallinity and morphology both before and after exposing the crystals to a process for removal of sodium impurities.

FIG. 1 shows XRD data for ZSM-58 crystals synthesized using the above formulation. The bottom plot in FIG. 1 shows the diffraction spectrum for ZSM-58 crystals as synthesized and prior to removal of sodium impurities. The middle plot shows the XRD spectrum after exposing the crystals to one complete cycle of the process for removing sodium impurities. The top plot shows the XRD spectrum for crystals exposed to two sodium impurity removal cycles. As shown in the bottom plot in FIG. 1, the as synthesized ZSM-58 crystals appear to exhibit sharp diffraction peaks at the expected locations for ZSM-58. The middle and top plots show that the diffraction spectrum still appear to exhibit good crystallinity after exposure to one or two cycles of the alkali metal impurity removal process. Thus, based on XRD data, the crystallinity of ZSM-58 crystals does not appear to be significantly affected by the alkali metal impurity removal process.

Figure 2A:
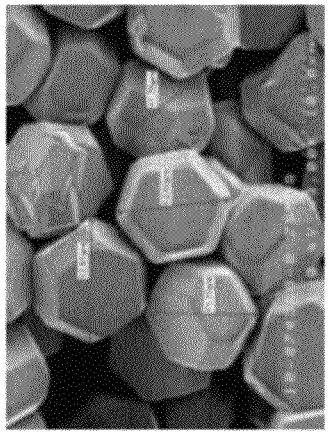
FIGS. 2a, 2b, and 2c show SEM micrographs of ZSM-58 crystals.
Figure 2B:
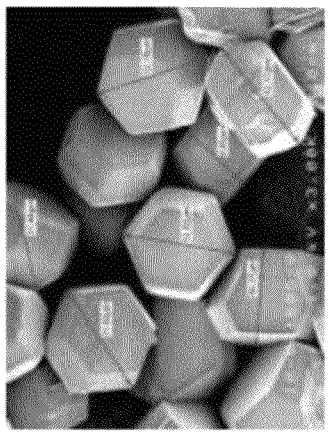
Figure 2C:
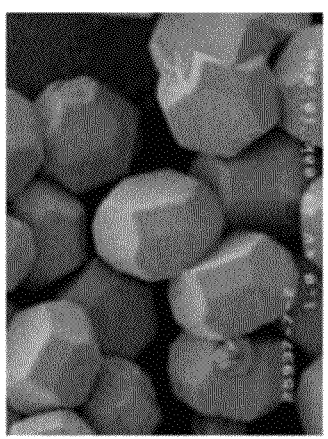

FIGS. 2a-2c show SEM micrographs of crystals from the samples used for the XRD studies in FIG. 1. FIG. 2a shows the morphology of as synthesized ZSM-58 crystals before exposure to the alkali metal impurity removal process. FIGS. 2b and 2c demonstrate that the morphology and size of the crystals appeared to show no detectable change therefrom after exposure to the impurity removal process.

Example 2

Sodium Content

Additional ZSM-58 samples with high Si:Al$_2$ ratios were synthesized as described in Example 1. The composition of two different samples before and after an alkali impurity removal process is shown in Table 1 below. In Table 1, the compositions in the first and third rows correspond to as-synthesized ZSM-58 without an impurity removal process. The second row corresponds to the first ZSM-58 sample after one cycle of impurity removal. The fourth row corresponds to the second ZSM-58 sample after two cycles of impurity removals.

TABLE 1

| | Condition of Sample | Al$_2$O$_3$ (wt %) | Na (wt %) | SiO$_2$ (wt %) | K (wt %) |
|---|---|---|---|---|---|
| ZSM-58 (Sample 1) | As synthesized, calcined | <0.05 | 0.37 | 94.5 | <0.01 |
| ZSM-58 (Sample 1) | One impurity removal cycle, calcined | <0.05 | 0.01 | 95.1 | <0.01 |
| ZSM-58 (Sample 2) | As synthesized, calcined | <0.05 | 0.28 | 95.2 | <0.01 |
| ZSM-58 (Sample 2) | Two impurity removal cycles, calcined | <0.05 | 0.02 | 96.0 | <0.01 |

In Table 1, all of the samples shown are after calcination. This can allow for easier comparison of compositions, as any excess water in the crystals was removed by the calcinations. The potassium content for the samples was shown as verification that sodium was the primary alkali metal present in these crystals. The as-synthesized crystals for Samples 1 and 2 contained more than 0.25 wt % of sodium, in spite of an aluminum content of less than about 0.05 wt %. The low aluminum content indicated that the sodium present in the crystals was primarily sodium impurities, as opposed to sodium used for charge balancing of framework aluminum ions. Row 2 shows the composition for Sample 1 after an impurity removal cycle. The impurity removal cycle appeared to be effective for reducing the sodium content of the crystals to less than 0.01 wt %. This amount was roughly comparable to the amount charge balancing cations needed for the alumina content of the sample. Row 4 shows that a similar sodium reduction was achieved after two impurity removal cycles for Sample 2.

Example 3

Modification of Adsorption

Figure 4:
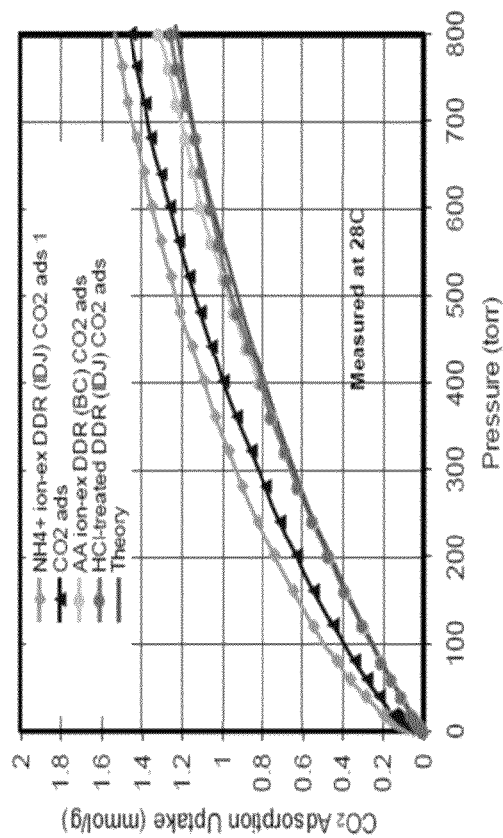
FIG. 4 shows $CO_2$ adsorption isotherms for ZSM-58 crystals.
Figure 3:
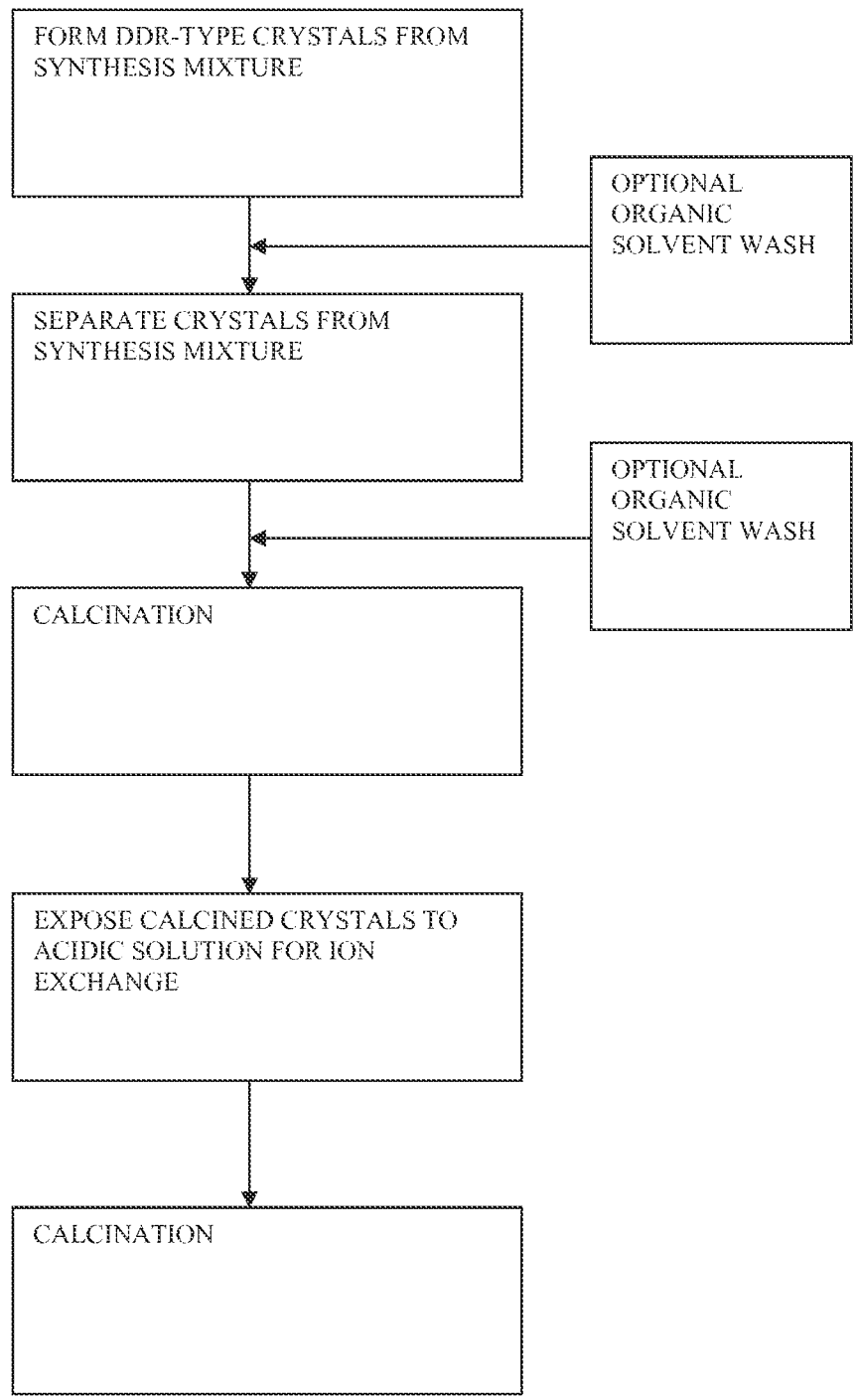
FIG. 3 shows an example of a process flow for performing an alkali metal impurity removal process

FIG. 4 shows adsorption isotherms for a variety of ZSM-58 crystals synthesized according to the procedure in Example 1. CO$_2$ adsorption isotherms were obtained for four different crystal samples. One crystal sample was studied as synthesized and was not exposed to an alkali metal impurity removal cycle. Two of the samples were treated with an alkali metal impurity removal cycle according to the invention. One of the impurity removal cycles involved treatment with hydrochloric acid, while the other sample was treated with acetic acid. A fourth sample was treated with the procedure of an impurity removal cycle, but with ammonia in place of an acid.

As shown in FIG. 4, the removal of a small amount of alkali impurity from DDR crystals appeared to significantly affect the CO$_2$ adsorption isotherm. FIG. 4 shows the adsorption isotherm for as-synthesized DDR crystals containing a small amount of alkali impurity (approximately 0.25%). Also shown is the adsorption isotherm for DDR after the alkali impurities had been removed by either acetic acid or HCl exchange. It can be seen that the adsorption isotherm appeared to have decreased to a level near that predicted by theory for an ideal DDR framework. The difference in the adsorption uptake was at least about 0.05 mmol CO$_2$ per gram of zeolite at CO$_2$ partial pressures of about 300 torr (about 40 kPa) or greater (which could alternately be expressed in terms of absolute/gauge, instead of relative, pressures). It was unexpected that the removal of such a small amount of impurity would have had such a large effect on the isotherm. Generally, for relatively high silica DDR samples, exchanges with either acetic acid or hydrochloric acid can result in decreased adsorption levels. The decrease in adsorption was not observed for all types of ion exchanges. FIG. 4 shows that exchange with ammonia appeared to increase the adsorption isotherm, rather than decreasing it. Treatments with other materials, such as methanol, were not observed to produce the types of reductions in the strength of the adsorption isotherm as seen with acid exchanges. The small amount of alkali metal impurity appeared to produce a significant excess adsorption, e.g., that could be susceptible to poisoning by foluants over time in a separation process.

Figure 5:
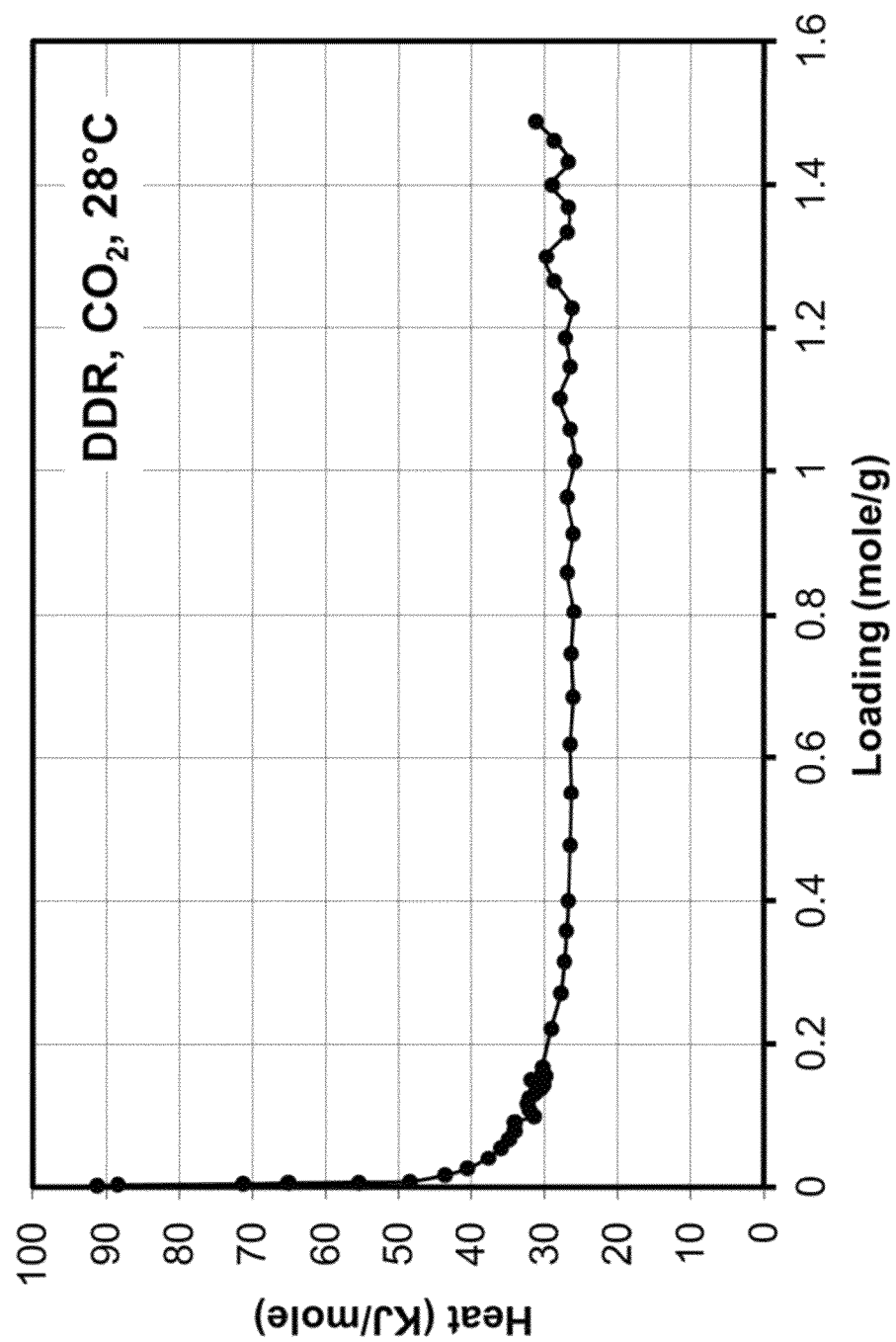
FIG. 5 shows the heat of adsorption for ZSM-58 crystals that have not been treated to remove alkali impurities

Excess adsorption from the alkali impurity can be detectable in a calorimetric adsorption experiment, where the heat of adsorption can be measured as a function of the loading in the DDR crystals. FIG. 5 shows the calorimetrically determined heats of adsorption for DDR crystals that were not exchanged. There appeared to be a dramatic rise in the heat of adsorption at relatively low loadings. This dramatic rise was not observed with DDR crystals that had been exchanged to remove the alkali impurities.

The reduced adsorption for crystals treated with an impurity removal cycle was verified by exposing such crystals to a fouling environment for an extended time period. Crystals with reduced sodium impurity levels were exposed to a base gas containing components such as $CO_2$, $H_2S$, $CH_4$, and $C_2$-$C_6$ hydrocarbons similar to a natural gas feed. Exposures were conducted at about 850 psig (about 5.9 MPag) and at about 100° C. The batches of crystals were exposed to the base gas for a ~1-month period. Exposures were repeated with and without water incorporated into the base gas. The $CO_2$ adsorption isotherms of the crystals with reduced sodium content appeared not to be significantly affected by the exposure to the base gas. A similar experiment, conducted with a cyclic exposure protocol using DDR crystals that had not been exchanged, appeared to show approximately a 30% reduction of the $CO_2$ isotherm, which seems to demonstrate the effectiveness of an impurity removal method for stabilizing the adsorption capacity of DDR-type crystals.

Alternative Passivation of Crystals

As an alternative to removal of the alkali metal impurity from the as-synthesized crystals, the alkali can be removed after the crystals have been incorporated into a bed. Another alternative can be to remove the alkali after beds have been formulated into a contactor. These alternatives may be done individually or in tandem.

As an alternative to performing an alkali metal impurity removal process, DDR-type crystals containing alkali-metal impurities can be passivated prior to use in an adsorption process, such as a swing adsorption process. For example, an adsorbent containing DDR-type crystals can be exposed to a pre-processing gas feed that contains a known foulant, such as $H_2S$. Without being bound by theory, it is believed that the alkali metal impurity sites can adsorb foulant species such as $H_2S$ strongly, so that the foulant cannot be displaced during typical exposure of the adsorbent crystals to a natural gas feed or another feed for a separation. As a result, an initial passivation process can be used to eliminate the excess adsorption capacity of the alkali metal adsorption sites, allowing for future stable operation of an adsorption process. Optionally, a foulant passivation process can be performed on DDR-type crystals that have been exposed to an alkali metal impurity removal process.

As an additional benefit, it was found that removal of the alkali impurities from DDR crystals can also improve the rheological properties of slurries used to coat films of DDR in processes used to make beds. For example, slurries of colloidal silica and ion exchanged DDR can be readily doctor-bladed onto a support to form relatively uniform ~50-400 micron thick films; however, uniform films of DDR that had not been exchanged were not successfully cast. Similarly, it can be advantageous to ion exchange DDR before incorporating it into a slurry with colloidal silica that can be wash coated onto a monolith.

Although the present invention has been described in terms of specific embodiments, it is not necessarily so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A method for performing a gas separation, comprising:
    contacting an adsorbent or membrane comprising DDR-type zeolite crystals with an input gas stream containing a first component and a second component to form a first gas stream enriched in the first component relative to the input gas stream; and
    collecting a second gas stream enriched in the second component relative to the input gas stream,
    wherein the DDR-type zeolite crystals are synthesized using a synthesis mixture having an alkali metal to silica ratio of at least about 0.01, the adsorbent being comprised of crystals with an alkali metal impurity content of about 0.05 wt % or less; wherein the DDR-type zeolite crystals as synthesized have an alkali metal impurity content of at least about 0.1 wt %, the alkali metal impurity content being reduced prior to contacting the adsorbent by exposing the DDR-type zeolite crystals to an alkali metal impurity removal process.

2. The method of claim 1, wherein the adsorbent is in a swing adsorber unit, the adsorbent adsorbing at least a portion of the second component during the contacting.

3. The method of claim 2, wherein the swing adsorber unit is a rapid cycle pressure swing adsorber unit or a rapid cycle temperature swing adsorber unit.

4. The method of claim 1, wherein the first gas stream is a retentate stream and the second gas stream is a permeate stream.

5. The method of claim 1, wherein the DDR-type zeolite is Sigma-1, ZSM-58, SSZ-28, or a combination thereof.

6. The method of claim 1, wherein a $CO_2$ adsorption isotherm for the DDR-type zeolite crystals as synthesized has an adsorption uptake that is at least about 0.05 mmol $CO_2$ per gram of zeolite greater than a $CO_2$ adsorption isotherm for the DDR-type zeolite crystals at a $CO_2$ partial pressure of at least about 40 kPa after the alkali metal impurity removal process.

7. The method of claim 1, wherein the alkali metal in the synthesis mixture comprises sodium.

8. The method of claim 1, wherein the DDR-type crystals have an alumina content of about 0.05 wt % or less.

9. The method of claim 1, wherein the first component is $CH_4$, and wherein the second component is $CO_2$, $N_2$, $H_2S$, or a combination thereof.

10. The method of claim 1, wherein the first component is a combination of $CH_4$ and $H_2S$, and wherein the second component is $CO_2$, $N_2$, or a combination thereof.

* * * * *